United States Patent Office 3,119,660
Patented Jan. 28, 1964

3,119,660
PROCESS FOR PRODUCING MOLECULAR
SIEVE BODIES
Peter A. Howell, Grand Island, and Nancy A. Acara, Kenmore, N.Y., assignors to Union Carbide Corporation, a corporation of New York
No Drawing. Filed Sept. 26, 1960, Ser. No. 58,200
26 Claims. (Cl. 23—112)

This invention relates to a process for producing synthetic crystalline zeolites of the molecular sieve type as massive bodies or shapes.

The zeolites hereinafter referred to are those crystalline metal aluminosilicates having a composition generally expressed by the formula:

$$M_{2/n}O:Al_2O_3:xSiO_2:yH_2O$$

wherein M represents at least one cation and $n$ represents its valence.

The crystalline zeolites contemplated in this invention consist basically of a rigid three-dimensional framework of $SiO_4$ and $AlO_4$ tetrahedra. The tetrahedra are cross-linked by the sharing of oxygen atoms so that the ratio of oxygen atoms to the total of the aluminum and silicon atoms is equal to two, or $O/(Al+Si)=2$. The electro-valence of each tetrahedron containing aluminum is balanced by the inclusion in the crystal of a cation, for example, an alkali or alkaline earth metal ion or other ions such as hydrogen or ammonium. One cation may be exchanged for another by various ion-exchange techniques. The spaces between the tetrahedra are occupied by water molecules prior to dehydration or activation of the crystal. Removal of these water molecules produces the characteristic pore system.

The crystalline zeolites produced by this invention include the rigid three-dimensional crystalline metal alumino-silicate structures capable of being dehydrated or activated to form molecular sieves, such as, for example, those described in greater detail in several patents and copending applications, i.e.: zeolite A, U.S. Patent 2,882,243, issued April 14, 1959, to R. M. Milton; zeolite X, U.S. Patent 2,882,244, issued April 14, 1959 to R. M. Milton; zeolite Y, application Serial No. 109,487, filed May 12, 1961, in the name of D. W. Breck; zeolite L, application Serial No. 214,479, filed August 3, 1962, in the name of D. W. Breck and N. A. Acara; zeolite D, application Serial No. 273,549, filed April 17, 1963, in the name of D. W. Breck and N. A. Acara; zeolite T, U.S. Patent No. 2,950,952, issued August 30, 1960, also in the name of D. W. Breck and N. A. Acara; and zeolite R, U.S. Patent No. 3,030,181, issued April 17, 1962, in the name of R. M. Milton. The process of this invention may also be used to prepare counterparts of naturally occurring hydrated rigid three-dimensional crystalline metal alumino-silicate structures dehydratable to molecular sieves, such as faujasite, chabazite, gmelinite, analcite, mordenite and erionite.

Generally, any particular crystalline zeolite will have values for $x$ and $y$ in the above formula that fall in a definite range. The value $x$ for a particular zeolite will vary somewhat since the aluminum atoms and the silicon atoms occupy essentially equivalent positions in the crystal lattice.

The various types of crystalline molecular sieve zeolites may among other ways be differentiated on the basis of adsorption pore size or the operative diameter defined by the crystal structure. They are also distinguishable by virtue of the particular cation or cations such as sodium, potassium, calcium, ammonium, etc., which have been integrated into the crystal.

Among the ways of identifying crystalline molecular sieve zeolites of the molecular sieve type and distinguishing them from other crystalline substances, the X-ray powder diffraction pattern method has been found extremely useful. This technique, particularly when associated with the results of the chemical analysis and adsorption measurements of the crystalline product, is a reliable means of identification. For instance, if one were to rely on chemical analysis alone, it would be difficult to accurately distinguish a true crystalline zeolite from a chemically similar but structurally different material such as sodalite or hydroxy-sodalite. Hydroxy-sodalite is a felspathoid material having the formula:

$$Na_2O \cdot Al_2O_3 \cdot 2SiO_2 \cdot xNaOH \cdot zH_2O$$

wherein $x$ may be about 0.3 and $z$ may be about 1, in which, unlike the crystalline zeolites of the molecular type referred to herein, NaOH fills the cavities of the structure. In other sodalite-type materials the occluded substance may be, for example, sodium halide or various sulfates and nitrates. Consequently, sodalite-type materials do not exhibit the rigid stable structure characteristic of, nor do they exhibit the adsorption properties of, crystalline molecular sieve-type zeolites.

The crystalline zeolitic molecular sieves are, when suitably dehydrated or activated, generally characterized by a high adsorption capacity; more especially their unique structure permits selective adsorption of fluids depending to a large extent on the size of the interstitial voids or pores of the activated crystalline zeolite. Thus, various molecular species may be readily adsorbed, slowly adsorbed or completely excluded, depending on their size, shape, polarizability and polarity. This adsorption behavior is widely utilized in such processes as gas purification and separation. Thus, for example, when zeolite A is synthesized from reactant mixtures containing substantial amounts of sodium cations, the sodium form is obtained, which when activated is particularly useful for the adsorption of molecules having critical dimensions smaller than about 4 Angstrom units while refusing larger-sized molecules. U.S. Patent 2,82,243 also describes the modification of the selective adsorption properties of sodium zeolite A that can be obtained through cation exchange. For instance, when at least about 40 percent of the sodium cations are exchanged for divalent calcium cations the characteristic adsorption pore size is enlarged to about 5 Angstrom units, yielding a molecular sieve which has been found to be extremely useful in petroleum processing directed toward octane improvement of motor fuels.

These crystalline zeolites of the molecular sieve type have up to now been synthesized only in the form of fine powders, generally of a particle size less than about 10 microns, from standard commercial reactants including sodium silicate, silicic acid, colloidal silica sols, silica gel, alumina and sodium aluminate.

As stated hereinabove, molecular sieves have up to now been synthesized in the form of a finely divided crystalline powder, with crystals usually less than about 10 microns in size. However, the design and construction of separation and adsorption equipment to accommodate crystals of this size or the use of existing equipment for the same purpose is not always practical, since the use of these crystals causes high pressure drops through fixed beds for fluid separations. Additional difficulties are encountered in attempting to fluidize the crystals of this size.

Therefore, for many commercial uses of molecular sieves it is more desirable to have a larger molecular sieve body or agglomerate rather than the small crystals in order to achieve the highest possible volumetric adsorption capacity as well as to facilitate handling of the adsorbent. At the same time, it is desirable that this agglomerate have not only such characteristics as relatively high attrition resistance and crush strength, but also that it retain substantially all the adsorption capacity, adsorption selectivity, and thermal stability characteristics exhibited by the finely divided crystalline material.

Methods for preparing agglomerates such as spheres, beads, etc., from molecular sieve powder are known. Such methods involve the use of a suitable binder material such as a clay, an inorganic compound, or an organic compound. These methods, at least one of which has been adapted to large-scale production with satisfactory results, are, however, relatively complex and require careful control to insure consistent properties in the agglomerated product. Furthermore, the binder occupies a portion of the agglomerate volume but performs no adsorptive function and, hence, the volumetric adsorption capacity of the agglomerate is limited at least to the extent that the binder is present.

It is, therefore, an object of the present invention to provide a novel method for producing polycrystalline molecular sieve adsorbent bodies in a wide variety of shapes and sizes.

It is a further object to provide such a process utilizing a suitable kaolin-type starting material.

In its broadest aspect, the present invention provides a method for producing a crystalline metal aluminosilicate zeolite in a preformed body which method comprises providing a preformed body containing a kaolin-type clay and reacting said body in an aqueous reactant mixture until crystals of said zeolite are produced in said body. The original shape and dimensions of the preformed body are substantially retained.

A novel feature of the shaped molecular sieve zeolite bodies produced by the process of the invention is their high percentage of active adsorbent compared to that of agglomerates formed by clay-bonding of zeolite powder.

A suitable starting material for supplying part of the desired constituents according to the process of this invention is a kaolin-type clay or a mixture of kaolin-type clays.

Kaolin-type clays or clay minerals have the general composition approximately $$Al_2O_3 \cdot 2SiO_2 \cdot 2-4H_2O$$

which makes such clays preferred for the synthesis of preformed zeolite A bodies; however, by adjusting the composition of the reactant mixture to be converted to zeolite with predetermined additional amount of a source of reactive silica such as colloidal silica sol, alkali metal silicate, etc., other species of three-dimensional crystalline zeolites in massive shapes having higher $SiO_2/Al_2O_3$ ratios may readily be prepared. Kaolin-type materials having $SiO_2/Al_2O_3$ ratios in the range of about 1.8 to nearly 2.3 are known, and these also may be used in the process of this invention.

The kaolin-type or two-layer clays are described as sheetlike crystalline silicates. Their basic structural unit is an aluminosilicate sheet consisting of a layer of silicon atoms in tetrahedral co-ordination with oxygen atoms, bonded to a layer of aluminum atoms in octahedral co-ordination with oxygen or hydroxyl. These sheets are stacked one on top of another to form the small plate-like crystals of the mineral. Representative of the clay minerals which contain this two-layer sheet and which may be used in the process of this invention are: kaolinite, livesite, nacrite, dickite, endellite and halloysite. They differ only in the way that the basic structural sheets are stacked and/or to the extent that inter-layer water molecules are present. Pure kaolinite, $[Al_2O_3 \cdot 2SiO_2 \cdot 2H_2O]$, has the composition by weight:

$Al_2O_3 = 39.56\%$
$SiO_2 = 46.54\%$
$H_2O$ (combined) $= 13.9\%$

The data of Table I include analyses of some typical kaolin-type clays found to be suitable in the process of the invention. As may be seen, the molar ratio of $SiO_2/Al_2O_3$ in these examples varies, i.e., 1.9, 2.04 and 2.20, but is within the over-all range between about 1.8 and 2.3.

TABLE I

*Analyses of Typical Kaolin-Type Materials*

| Oxide | Georgia Kaolinite A | | Georgia Kaolinite B | | North Carolina Kaolinite C | | Utah Halloysite | |
|---|---|---|---|---|---|---|---|---|
| | Percent by wt. | Moles | Percent by wt. | Moles | Percent by wt. | Moles | Percent by wt. | Moles |
| Na$_2$O | 0.2 | | 0.40 | | } 0.82 | | <0.1 | |
| K$_2$O | <0.1 | | 0.43 | | | | | |
| Al$_2$O$_3$ | 40.2 | 1.0 | 37.20 | 1.00 | 37.2 | 1.0 | 37.3 | 1.00 |
| SiO$_2$ | 45.0 | 1.9 | 44.82 | 2.04 | 48.2 | 2.20 | 41.6 | 1.89 |
| Ign. loss (as H$_2$O) | 9.4 | 1.33 | 14.68 | 2.23 | 13.1 | 1.99 | 20.0 | 3.04 |
| TiO$_2$ | 2.5 | | 1.26 | | | | | |
| Other | 1.4 | | 1.31 | | 0.78 | | | |
| | 98.8 | | 100.1 | | 100.1 | | 98.9 | |

Kaolin-type clays are also known by such names as "ball clay," "fire clay," "papermaking clay," "filler clay," "coating clay," and "china clay." Commercial kaolins may be contaminated with quartz, fine-grained mica, hydrous micas and sometimes feldspar, but their presence at impurity levels will generally not be detrimental to either the process or the shaped zeolite product. Commercially available kaolin-type materials are, for example, "Avery" clay sold by Harris Clay Company, "Edgar" kaolins, sold by Minerals and Chemicals Corporation, and "Hydrite" kaolins, sold by Georgia Kaolin Company.

Kaolin-type clays or clay minerals when thermally treated appear to undergo several transitions, although the exact natures of the products of such transitions are not clearly known nor are the mechanisms of the transitions completely understood. There is in fact considerable speculation and disagreement in the literature concerning this matter. When kaolin-containing clays are heated in air for a sufficient length of time, the first of these transitions is observed to begin at about 550° C.–600° C., where the crystalline silicate sheets are apparently altered or disordered, yielding a product which is essentially amorphous to X-rays. This transition product or metastable phase is sometimes referred to as "metakaolin," "metakaolinite," "dehydrated kaolin," or "dehydroxylated kaolinite." Roy et al. [Jour. Amer. Ceram. Soc. 38, 205 (1955)] have defined "metakaolinite" as "a metastable high-free-energy phase in the range 600° C. to 900° C." At about 950° C. another transition apparently occurs.

As stated hereinabove, the exact nature of the transformed kaolin associated with a thermal treatment at 550°–850° C. is not clearly known, because it is essentially amorphous to X-rays. By "amorphous to X-rays" it is meant that the X-ray spectrometer trace exhibits substantially no sharp diffraction bands and is similar to that obtained for a glass. For reasons given hereinbelow this transformed kaolin as is used in the process of this invention will be referred to as "reactive kaolin."

Although kaolin-type materials have a chemical composition which makes them adaptable as reactants for the synthesis of crystalline zeolite bodies of the molecular sieve type, it has been discovered that such kaolin-type materials must have undergone a particular thermal treatment before being useful, i.e., reactive, in the practice of this invention.

In one aspect of the invention shaped bodies containing raw kaolin with or without a diluent, or raw kaolin and powdered crystalline zeolite, are fired to make the kaolin reactive, and contacted with an alkaline liquor to form a reactant mixture by means of which, upon digestion and crystallization, the bodies are converted to substantially pure crystalline zeolite in situ. In another aspect of the invention, bodies are shaped from reactive kaolin with or without zeolite powder addition, and are similarly digested and crystallized to achieve conversion to zeolite in situ. Furthermore, bodies may be shaped from mixtures of reactive kaolin and raw kaolin and subsequently fired to make them reactive in the following steps.

The aforementioned term "diluent" is used herein to describe a class of materials which may be added in a finely divided state to a kaolin-type clay to aid in establishing voids within the subsequently shaped body during the firing step. The diluent is combustible and the voids are created as a result of the partial or complete combustion. Such voids serve to make the reactive kaolin-containing body more porous and thus facilitate conversion in the digestion and crystallization steps. These voids created by the diluent materials in the shaped body, are however, of a macroporous nature and are therefore not to be confused with the regularly spaced interstitial voids and channels in which adsorption may occur in dehydrated crystalline zeolites.

In one form of the invention the raw kaolin-containing material is given thermal treatment described hereinbelow prior to the shaping step, when this material is in powder form. For this purpose a satisfactory range of ultimate particle sizes is, in terms of (average) equivalent spherical diameter, less than about 75 microns (200 mesh) size. Raw kaolin-type materials may be put into such condition by ordinary mechanical means or may be obtained commercially in suitable particle sizes. Representative particle sizes for commercially available raw kaolin-type materials useful in this process are in the range of 50 to 0.1 microns. Also commercially available are kaolin-type materials already suitably fired to the reactive kaolin condition; they usually have particle sizes in the range of 50 to 0.1 microns.

As stated hereinabove, one may also defer the required thermal treatment until after the raw kaolin-type material, with or without other ingredients such as an amount of reactive kaolin added thereto, is shaped or formed into compacts or bodies as described below. Thus, the required transformation of raw kaolin-type materials to reactive kaolin substance may be effected in situ. The kaolin-type substance useful in the process of the invention may be made up of a single type or species of kaolin-type mineral or a mixture of members of the kaolin group.

When the kaolin-type material is to be converted to reactive kaolin by a thermal treatment, the temperatures and times at which the conversion is best carried out are interdependent. For instance, a minor degree of conversion will take place at temperatures at, and slightly below 550° C.; that is, on a percentage basis, there will be some reactive kaolin in any batch so treated. Above 600° and preferably between 600° C. and 850° C. total conversion to the reactive kaolin state might be expected if the firing conditions are maintained for a sufficient length of time. A higher firing temperature lessens the time required, and conversely at less than about 600° C., a considerably greater period will be required to bring about a suitable degree of conversion. We have found that at a firing temperature of 600° C., for powdered kaolin-type materials at least about 45 to 60 minutes are usually required to produce substantial quantities of crystalline zeolite; somewhat shorter periods of firing at 600° C., while causing some alteration of the original kaolin structure do not make the kaolin sufficiently reactive to produce more than minor amounts of crystalline zeolite in the body subsequently shaped from such fired material. At the same time undesirably large amounts of hydroxysodalite are obtained in the shaped body. The presence of hydroxy-sodalite, or other sodalite-type materials, none of which is a rigid three-dimensional crystalline zeolite of the molecular sieve type, to the extent of more than about 20 wt.-percent (but preferably not more than about 10 wt.-percent) in the shaped body is undesirable because the adsorption capacity per unit volume thereof is somewhat reduced. In the region of about 700° C. to 800° C., firing times of as low as 10–15 minutes have been used with satisfactory results when relatively thin beds of charge material, in powder form, on the order of ¼ to ¾ inch in depth, are used. However, at least about one hour is usually preferred to insure thorough treatment of the charge.

After kaolin-type materials have been brought into a reactive condition for the synthesis of preformed crystalline zeolite bodies, this condition of reactivity is retained during storage. Thus, for example, in the process of this invention one may also use as a starting material a commercially available kaolin-containing material, as previously mentioned, that has already been suitably fired to achieve the transformation to reactive kaolin, or, alternatively, a mixture comprising portions of raw kaolin and reactive kaolin. This mixture is then heated in a gas-fired or electrically-heated furnace, kiln, oven, etc., or by other suitable means to convert the raw kaolin-type material to the reactive kaolin state.

When the step of firing to form reactive kaolin is conducted after the body has been shaped from raw kaolin, or from a mixture of raw kaolin and reactive kaolin, possibly along with other ingredients such as a void-forming substance, the temperatures for conversion to reactive kaolin are again in the range of about 600–850° C., using a firing time of at least about 30 minutes. When a quantity of zeolite powder is incorporated with the raw kaolin before shaping, the firing temperature employed must be adjusted to the thermal stability limit of the particular zeolite, as described hereinbelow.

Ambient air or a moving air stream is conveniently used as the atmosphere in which the kaolin-type materials are fired; however, other firing atmospheres may be used if desired.

In compacting or forming bodies or "preforms" from raw kaolin or reactive kaolin or mixtures thereof, any of several methods may satisfactorily provide whatever shape is desired, as for example, beads, spheres, pellets, tablets, briquettes, granules, cylinders, tubes, disks, partitions, toroids, cubes, blocks and the like. These may be bodies of relatively small size such as granules as well as bodies of more massive section such as pellets or blocks, depending upon the desired end use. Representative of means which may be used to accomplish the shaping or forming step are molding, extruding, tumbling, drum-rolling, casting, slip-casting, disk-forming, belt-forming, prilling, tableting and briquetting.

Although kaolin-type materials when in powdered form as described hereinabove are generally more useful for a variety of shaping procedures, one may also employ in the process of the invention kaolin-type materials available in certain useful shapes from commercial sources. For example, raw kaolin type clay in form of pellets of approximately cylindrical shape about ¼ inch diameter is commercially available, and these shapes can be fired to make them reactive for subsequent digestion and crystallization, if adsorbent bodies of such size are desired for a particular end use. Similarly, commercially available kaolin shapes that have been suitably fired to make the kaolin reactive may be used in accordance with the invention.

In the process of this invention at a point just prior to the digestion-crystallization reactions the shaped bodies, wherein substantially all the kaolin is in the reactive kaolin state and wherein the moisture content is less than about 30 wt.-percent and usually less than about 20 wt.-percent, are in what may be considered a "green" (i.e., not yet converted to crystalline zeolite) state. Although the green preforms are often converted to crystalline zeolite in an adjacent processing zone as soon as the particular processing schedules permit, these bodies, particularly those having relatively simple shapes such as pellets, spheres or cylinders, have sufficient green strength that they may be stored for periods of time before conversion, or may, if desired, be transported over a substantial distance for conversion at another location.

In the next step of the process of this invention, the shaped reactive body is to be made part of the over-all reaction mixture for conversion to polycrystalline zeolite. Before such reaction mixture can be prepared, one must previously have determined by chemical analysis the composition, usually given in terms of the oxides, of the kaolin-type starting material. Usually the raw kaolin is analyzed, and another analysis made of the reactive kaolin to control the overall composition of the reactant mixture, since such composition is critical to the formation of the desired zeolite species. Similarly, the moisture content of the green bodies must be known and its value taken into account in arriving at the desired over-all reactant composition. The ambient liquor, which may also contain known quantities of any other components of known chemical composition as may be required for the particular over-all composition of the reactant mixture, is then contacted with a quantity of the shaped or preformed reactive kaolin-containing bodies in such proportions that upon mixing, the resulting aqueous reaction mixture will contain in the aggregate quantitative amounts (in terms of moles of oxides) of aluminum, silicon, metal and possibly other cations, and water, along with any substances that may be needed to facilitate the conversion process, that upon subsequent reaction thereof under specific conditions the preform will be converted in situ to the desired crystalline zeolite. Also, as described hereinbelow, certain materials may be combined with the kaolin-type substance prior to shaping the body, and some or all of these materials will contribute to the over-all composition of the initial reactant mixture. Thus, in the preparation of such preformed crystalline zeolites, the aqueous reactant mixture, made up of the ambient liquor and the shaped body, will in the aggregate have an initial over-all composition, defined in terms of oxide-mole ratios, as follows:

$M_2O/SiO_2 = a$
$SiO_2/Al_2O_3 = b$
$H_2O/M_2O = c$ where the particular values of $a$, $b$ and $c$ are the essential determinants for the type of crystalline zeolitic material to be produced, where M is at least one cation such as alkali metal, ammonium, etc.

In producing preformed silica-rich zeolites such as X, Y, S and T hereinabove identified, additional silica over and above the amount of silica supplied by the reactive kaolin must be provided. Accordingly, all or part of the required silica, in the form of colloidal silica sol, silica gel, silicic acid, alkali metal silicate, and the like, may be included in the mixture to be shaped and thus enrich the over-all reactant mixture to provide for crystallization of the high-silica zeolite product.

It has been discovered that incorporation of this additional silica into the reactant mixture from which these silica-rich zeolites are subsequently crystallized is aided, and product purity is enhanced, by inclusion in the mixture to be shaped of small amounts of organic gelling or thickening agents such as, for example, resins of the water-soluble ethylene oxide polymer type. When resins of this or similar types are used in admixture with reactive kaolin and with or without additional silica, a heating step, at temperatures in the range of about 200° to 700° C., is preferably conducted after the shaping step to at least "set" or even partly or wholly carbonize the resin in the shaped body and to remove some moisture, after which the body is digested and crystallized in a suitable reactant mixture in accordance with the invention. When such resins are employed in admixture with raw kaolin, this setting is accomplished during the step of firing the shaped body to make reactive kaolin therein. It is contemplated that such agents may also serve as diluents, as hereinabove defined, in the shaped bodies or they may be used in combination with a diluent or diluents if desired. Furthermore, such agents may also be effectively used to impart strength and cohesion to the shaped body when no materials other than reactive kaolin or raw kaolin are present therein.

Also, if one desires to supply alumina over and above that supplied by the reactive kaolin, a source of alumina such as alumina trihydrate, activated alumina, or alkali metal aluminate may be blended with the kaolin material prior to shaping.

In preparing the ambient alkaline liquor prior to the introduction of the shaped reactive kaolin bodies which bodies may also contain a diluent substance or a quantity of powdered crystalline zeolite, any of several suitable materials may be used to supply the additional ions needed to achieve the over-all initial reactant mixture composition. For instance, representative reactants are silica gel, silicic acid, colloidal silica sol, or alkali metal silicate as a source of added silica. Additional alumina ions may be furnished by activated alumina, gamma alumina, alumina trihydrate, or alkali metal aluminate. An amount of alkali metal oxide is included in the aqueous liquor; when producing shaped zeolite bodies in which the cation is predominantly or exclusively sodium, such amount may be introduced into the liquor in the form of sodium hydroxide. Similarly, when producing shaped zeolite bodies in which the cation is predominantly or exclusively potassium or lithium, such additional amount of corresponding potassium or lithium ion may be introduced into the reactant mixture in the form of the hydroxide.

Representative of specific over-all reactant compositions which are useful for producing massive preformed shapes of crystalline molecular sieve zeolites according to the process of the present invention are the following.

For sodium zeolite A:

$Na_2O/SiO_2 = 0.5-1.5$
$SiO_2/Al_2O_3 = 1.6-2.4$
$H_2O/Na_2O = 10-100$

For sodium zeolite X:

$Na_2O/SiO_2 = 1-1.5$
$SiO_2/Al_2O_3 = 2.5-5$
$H_2O/Na_2O = 30-60$

For sodium zeolite Y:

$Na_2O/SiO_2 = $ about 0.5
$SiO_2/Al_2O_3 = $ about 7
$H_2O/Na_2O = $ about 40

Shaped bodies of crystalline zeolites having mixed sodium and potassium cations in the as-crystallized product may be similarly obtained using reactive kaolin and alkali metal hydroxide or hydroxides among the components of the over-all reaction mixture. Representative species of this group are zeolites D, L and T identified hereinabove.

It has also been discovered that the preparation of silica-rich zeolite shapes having a $SiO_2/Al_2O_3$ ratio beyond about three such as sodium zeolite Y by the process of the invention can be enhanced by first contacting reactive kaolin powder with a suitable aqueous reactant mixture as a "predigestion" step prior to the shaping operation. This predigestion step apparently aids in the incorporation of silica into the silica-rich zeolite structure. The reactant mixture employed in this manner preferably contains a water-soluble alkali metal salt which contributes to the formation of higher purity products and to the reproducibility of results. The alkali metal of the salt is preferably the same as the alkali metal of the reactant mixture in which the salt is employed. The useful concentration range of the salt addition is about 0.1 to 5 moles per mole of $Al_2O_3$, with preferably about one to two moles of salt per mole of $Al_2O_3$ when the preferred reactant compositions are employed. Following the predigestion step the solids are filtered after which the filter cake is extruded or shaped by other means. The shaped bodies are then returned to the mother liquor for the digestion and crystallization reactions.

Digestion and crystallization of the shaped body may be accomplished by treating the reaction mixture in a single step or in two separate steps. When digestion and crystallization are conducted in separate steps, the first or digestion step takes place at a temperature from about room temperature (20–25° C.) up to about 55° C. Although the nature of the reactions taking place in this step are not clearly understood, it is believed that the system undergoes a type of diffusion or ripening process which prepares or otherwise conditions the reactants for conversion to the desired zeolite species in the second or crystallization step. The first step may, however, under some conditions, be omitted as such, depending on the type of zeolite to be produced, the purity desired, reaction temperature and time, and other process factors.

The second or crystallization step of the process need not of necessity employ a reactant mixture of the same composition as that used in the first step. Thus, within the limits of reactant composition ratios specified for producing a particular zeolite species, one may add reactants, and/or possibly other substances as processing aids, during one or both steps, or between steps, as desired. In the second step the reaction temperature is usually maintained at between about 75 and 100° C., until crystals of the desired species form in situ, and may be maintained at temperatures up to about 175° C., although operation above about 100° C. requires pressure vessels and there is a tendency for the formation of unwanted aluminosilicates such as hydroxy-sodalite.

After the crystallization step, the zeolite bodies are separated from the spent reactant or mother liquors by removing the bodies from the crystallization vessel, or by withdrawing the liquors from the vessel or by other means. The spent liquors thus separated may be reused for the next batch of shaped reactive kaolin articles after adjustment with amounts of reactants to again give a properly proportioned reactant liquor. The zeolite bodies are then washed, either in the crystallization vessel or in a separate vessel, until the effluent wash water in equilibrium with the zeolite has a pH of between about 9 and 12. Thereafter the bodies are dried, conveniently with circulating air or in a vented oven at a temperature of between about 25° and 150° C. For purposes of characterization of the product by X-ray diffraction and chemical analysis this drying is sufficient. Characterization of the product by adsorption measurements requires that the zeolite first be activated or dehydrated as described hereinbelow.

Intensive agitation of the reactant mixture during digestion and crystallization is not necessary. Gentle circulation of the ambient liquor around the shaped bodies during reaction is sufficient and in fact, excellent results have been achieved under quiescent conditions.

In obtaining the data given herein, at least one X-ray diffraction spectrometer trace was secured of every zeolite product. From these traces the crystalline species present was identified. When proper controls were run (standard zeolites in the same hydration state run on the same day), estimates of percent composition could be made by comparing the intensities of certain X-ray lines in the preform sample with the intensities of the same lines in the standard. X-ray determinations on the products are usually lower than the determinations of purity based on adsorption measurements. Because of this difference, the reason for which is not entirely clear, the values of product purity reported herein by the X-ray method are minimum values. As used herein, the terms "product purity" in percent, and "product composition" in percent, when based on the X-ray method of analysis described above, are defined as follows:

$$S_1/S_2 \times 100 = \text{percent product purity}$$

where $S_1$=sum of intensities of suitable X-ray lines measured on the preform sample.
$S_2$=sum of intensities of the same X-ray lines measured on the reference standard.

Adsorption measurements on samples of the preformed zeolites obtained by the process of this invention were carried out in a McBain-Baker adsorption system. Before adsorption measurements are made, the crystalline zeolite body must be activated or dehydrated by heating, preferably at reduced pressure, for example, at 350° C. and at a pressure of less than about 0.1 mm. Hg. The activated zeolite bodies made by the improved process of the invention have the molecular sieve properties characteristic of the particular species. The reference standards by which the relative purity of the shaped zeolite products was determined were very pure samples of the corresponding zeolite species prepared in powder form by the known synthesis method. As used herein, the terms "product purity" in percent and "product composition" in percent, when based on this adsorption method of analysis, are defined as follows:

$$W_1/W_2 \times 100 = \text{percent product purity}$$

where $W_1$=weight loading of adsorbate measured on the activated preform.
$W_2$=weight loading of the same adsorbate measured on the activated reference standard.

In accomplishing the forming of relatively massive shapes from kaolin-type materials, with or without diluent materials incorporated, for subsequent conversion to crystalline zeolite, it is contemplated that a number of different forming or shaping methods may be employed, as stated hereinabove. A convenient method involves first making a slurry or paste of the kaolin-containing mixture with sufficient water to achieve the desired consistency for extrusion through a die to form the bodies, often in a generally cylindrical shape. Before conducting the extrusion or other shaping step, it may be desirable to also intermix small amounts of other materials such as lubricants, extrusion aids, gelling or thickening agents, surface-active agents, and the like. Extrusion-forming of bodies in accordance with the practice of the present invention is a convenient means of producing such bodies particularly where large quantities are required.

Forming by slip-casting is another technique applicable to the preparation of zeolite bodies in almost any desired shape. For example, articles of such useful shapes as tubes, cylinders, and funnels may be formed by pouring kaolin-water "slips" into molds of appropriate shape. Also, droplets of kaolin-water slip may be formed by such means as dropping the slip through a tube onto an adsorbent plate to promote surface drying, resulting in this case in beads having a beehive-like shape.

Similarly, water slurries or kaolin-type clays may be processed to remove the bulk of the water, for example, by filtering, after which the moist shape or filter cake is cut up into disks of the desired thickness. From these bodies partitions of polycrystalline zeolite are subsequently obtained in accordance with the invention.

As would be expected in view of the variety of shaping methods which may be employed to carry out the shaping step of this invention, practicing any one of these shaping means involves adjustment of the moisture content of the mixture to be shaped according to the consistency required for that particular method. For example, slurries or slips for slip-casting have a relatively high water content, while a mixture which is to be formed into spherical particles, as by drum-tumbling or rolling, usually has a somewhat lower water content such that the mix is a moist, cohesive powder.

When a compacted body such as a pellet or raw kaolin is suitably fired, a rather dense, coherent body of reactive kaolin results. The rate of conversion of such body to crystalline zeolite may accordingly be somewhat less than that desired for conversion operations on a relatively large scale, or the degree of conversion, i.e., product purity obtained with such dense bodies even after prolonged digestion and crystallization reactions may sometimes not be sufficiently high, to make such bodies useful as adsorbents for certain purposes. Therefore, as stated hereinabove, we have found that diluents or void-forming substances may be advantageously incorporated into the kaolin material before the shaping step to facilitate conversion to crystalline zeolite, in that the reactive kaolin body is thus made more permeable to diffusion of reactants therein during the digestion-crystallization reactions.

Incorporation of such diluents into raw kaolin-type materials significantly improves the purity of the converted zeolite body. Powdered raw kaolin is intimately mixed with a quantity of one or more finely divided diluent substances until one obtains a substantially uniform mixture of kaolin and diluent substance. Representative of the combustible diluents which may be used in the process of the invention are sawdust, powdered carbon, lampblack, powdered coke, methyl or ethyl cellulose or other organic resin, wood flour, starch and the like. While satisfactory results have been obtained using as much as 50% by weight of diluent in shaped kaolin bodies, from about 1 to 30% by weight of diluent is preferred, since somewhat larger amounts ultimately tend to decrease the density of the converted zeolite body, with the result that the volumetric adsorption capacity is correspondingly reduced. Volumetric adsorption capacity may be evaluated by means of a "capacity factor," which as used herein is the product of the density of the zeolite body and the percent conversion or percent purity of that body.

The data of Table II hereinbelow serve to illustrate this aspect of the invention wherein several types of diluents were individually incorporated into amounts of kaolin clay, from which mixture shapes were thereafter pelletized, and fired at 700° C. to form reactive kaolin, followed by digestion and crystallization in suitable reactant media for reaction times of about one to five days to produce pellets containing crystalline sodium zeolite A. From Table II it may be seen that where no diluent was used, the products contained approximately 60% sodium zeolite A, whereas those pellets into which varying percentages by weight of carbon and lampblack had been incorporated exhibited improved product purity.

The combustible diluents which may be employed herein should be materials which are combustible in air or oxygen-containing atmosphere at about the minimum firing temperature employed in bringing the kaolin to a reactive condition, i.e., about 600° C.

TABLE II

| Pellet Size, In. | Diluent [1] | Reaction Time, Days | Percent Zeolite A in Product |
|---|---|---|---|
| 3/16 | None | 1 | 59 |
| 3/16 | do | 4 | 62 |
| 3/16 | 5% carbon | 1 | 76 |
| 3/16 | 20% carbon | 1 | 82 |
| 1/16 | 7% lampblack | 1 | 71 |
| 1/16 | do | 4 | 87 |
| 1/16 | 20% carbon | 2 | 85 |
| 1/16 | 10% carbon | 5 | 87 |

[1] Percentage based on weight of dry mixture.

In another aspect of this invention bodies or articles are shaped from mixtures of powdered raw kaolin and reactive kaolin and the fired to bring substantially all of the kaolin-type material in the shaped body to the reactive kaolin state. Mixtures of raw kaolin and reactive kaolin containing upwards of 10% reactive kaolin by weight are preferred. These reactive bodies are contacted with suitable alkaline liquors and reacted until crystals form in situ. The use of raw koalin-reactive kaolin mixtures makes possible, in the case of sodium zeolite A, product purities of around 90% or better. This is demonstrated by the data of Table III, wherein 3/16-inch diameter pellets were extruded from various mixtures of raw kaolin and reactive kaolin and fired at 700° C. for 16 hours to bring the pellets to the reactive state.

TABLE III

| Reactive kaolin in admixture with raw kaolin, pct.[d] | Sodium zeolite A in product, pct.[a][b][c] |
|---|---|
| 0 | 62 |
| 10 | 60 |
| 20 | 90 |
| 40 | 92 |
| 60 | 89 |
| 80 | 87 |

[a] X-ray analysis.
[b] Reactant mixture composition:
$Na_2O/SiO_2 = 1.4$;
$SiO_2/Al_2O_3 = 2.0$;
$H_2O/Na_2O = 40$.
[c] Reaction conditions: Digestion—3 days at room temperature; Crystallization—1 day at 100° C.
[d] Based on weight of dry mixture.

In another aspect of the invention high-purity zeolite bodies are produced from a mixture of a finely divided kaolin-type material, either raw or reactive, and fine crystals of zeolite. Incorporation of a quantity of crystalline zeolite with kaolin, particularly raw kaolin, before the shaping step results in desirable processing characteristics, for example, relatively short over-all processing time, and a quite satisfactory product from the standpoint of purity, adsorption characteristics and physical properties.

The crystalline zeolite used here may be the same species as that which one desires in the shaped body after the crystallization step; or another type having a similar crystal structure but a different $SiO_2/Al_2O_3$ content or cation composition; or another type having a different crystal structure and cation composition. The zeolite incorporated in the mixture to be shaped may itself have been prepared from reactive kaolin or from reactants such as alkali metal silicate, silica gel, colloidal silica sol, alkali metal aluminate, alumina, and alkali metal hydroxide. A naturally occurring zeolite having either the same crystal structure or a different crystal structure, if such is available, may be incorporated in the mixture to be shaped; for example, erionite or chabazite crystals may be incorporated into a mixture from which zeolite A is to be crystallized, or faujasite crystals may be incorporated into a mixture from which zeolite X or zeolite Y is to be crystallized. In determining the quantities of reactants needed to provide the proper values for *a*, *b* and *c*, as hereinabove defined, for the case of aqueous reactant mixtures also containing added zeolite crystals, the composition of the additive zeolite is not included in such determination which in general is based primarily on the reactive kaolin content.

It is also within the scope of the invention to manufacture a mixed-cation polycrystalline zeolite body by employing a starting mixture containing a cation form (other than the cation subsequently used in making up the digestion-crystallization reactant mixture) of the zeolite and raw kaolin and/or reactive kaolin. For example, by incorporating a potassium-exchanged zeolite with kaolin-containing material and digesting and crystallizing the body shaped therefrom into a reactant mixture containing sodium ion, a sodium-potassium crystalline zeolite body may be obtained; concomitantly during the digestion-crystallization reactions a degree of ion-exchange between potassium and sodium ion may also occur.

The powdered kaolin and zeolite crystals, along with any other ingredients as may be required for the zeolite to be produced or as may be required to expedite processing, are combined by blending or other mixing means. From this mixture bodies of the desired shape and size as previously described are formed by extrusion, tumbling, slip-casting or other means. When raw kaolin is employed the resulting preforms or bodies are thereafter fired to convert the raw kaolin to reactive kaolin. Because of the crystalline zeolite in the shaped body, however, the temperature for treating the raw kaolin should be below the thermal stability limit of that zeolite. For example, in the case of zeolites A, X and Y, the firing temperature should not exceed about 700° C. and preferably a temperature between about 600° and 650° C. may be used. The resulting shapes are contacted with an aqueous liquor containing alkali metal hydroxide and any other ingredients such as silica and alumina as may be required to achieve the desired over-all reactant composition in terms of $R_2O/SiO_2$, $SiO_2/Al_2O_3$ and $H_2O/R_2O$, where R is alkali metal, and thereafter the reactant mixture is treated in the course of the digestion and crystallization steps to convert the preforms to substantially pure crystalline zeolitic bodies. These bodies are washed, dried, and activated or dehydrated to achieve the molecular sieve structure in bodies exhibiting relatively high volumetric adsorption capacity.

In making up the mixture to be shaped, the amount of zeolite incorporated therein may be from about 30 wt.-percent up to about 80 wt.-percent. Below about 30 wt.-percent the time required for conversion of the zeolite-reactive kaolin body to zeolite in the digester-crystallization reactions is unduly lengthened and the degree of conversion decreases. When making sodium zeolite A (also known as 4A) preforms, a preferred range of quantities of incorporated zeolite A powder is from about 40 to 60 wt.-percent, for obtaining particularly high-purity product. When the incorporated zeolite A powder content goes appreciably over 60 wt.-percent, equally good conversions of the preform are obtained but for economic reasons the handling of already-synthesized zeolite powder in a second process is desirably limited. Preferably a 50/50 mixture of ray clay and 4A powder is employed to give a 4A body having improved volumetric adsorption capacity and satisfactory physical properties.

Zeolite powder and raw kaolin are combined by blending, mulling, etc. and formed to the desired shape as by extruding. After shaping, the bodies are dried to a moisture content of less than about 20 wt.-percent, usually around 10 to 15 wt.-percent, and are fired at 625°–650° C. for about 30 to 60 minutes to convert the kaolin component to reactive kaolin.

In the conversion of the shaped body containing reactive kaolin and zeolite powder to polycrystalline zeolite in situ, conducting such conversion in two steps is usually preferred for consistently high product purity, particularly where large batches must be handled during a process cycle. In the first or digestion step for zeolite A, reaction temperatures in the range from about room temperature (20–25° C.) up to about 55° C. may be employed. The second or crystallization step may be conducted at reaction temperatures between about 75° and 175° C., but preferably in the range of about 75° to 100° C., which temperatures are convenient to maintain, especially for large-scale processing. Crystallization temperatures somewhat below about 75° C. require unduly long periods of time, while conducting the crystallization at temperatures above about 100° C. has the disadvantage of requiring the use of pressurized crystallization vessels. Reaction times of between about 3 and 80 hours for the first or digestion step at about room temperature may be employed, with between about 4 and 16 hours generally preferred for zeolite A preforms to achieve a practical processing cycle. In conducting the second or crystallization step at 75° to 100° C., reaction times of from about 3 to 30 hours may be employed, preferably between about 4 and 16 hours. Crystallization times less than about 3 hours tend to give lower purity product, while if the zeolite bodies are allowed to remain in contact with the mother liquor longer than about 36 to 40 hours contaminating amounts of other alumino-silicates may form.

For producing zeolite A bodies a preferred over-all reactant mixture composition is:

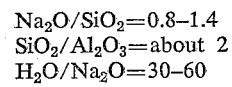

$$Na_2O/SiO_2 = 0.8–1.4$$
$$SiO_2/Al_2O_3 = about\ 2$$
$$H_2O/Na_2O = 30–60$$

for mixtures of raw kaolin and 40 to 60 wt.-percent 4A powder. If desired the digestion step may be conducted using a reactant mixture composition differing somewhat from that subsequently used in the crystallization step. Adjustment of reactant composition between the digestion and crystallization steps is conveniently accomplished by appropriate control of reactant solution of known composition, for example, caustic liquors, which can be admitted or withdrawn from the reaction vessel through suitable valves and piping. Table IV shows data on process conditions for sodium zeolite A exemplary of a preferred form of the process of the invention. In this table the term "capacity factor" is a value obtained as the product of the density of the zeolite body and the percent conversion or percent purity of that body. Use of this factor affords a means of comparing the volumetric adsorption capacity of adsorbent bodies. Furthermore, knowledge of such capacity values is useful in the selection and design of commercial adsorption equipment. By way of comparison, composites made by bonding 4A zeolite powder with a clay binder have a capacity factor of approximately 0.56. Thus, as will be noted from the values in Table IV, high-purity 4A bodies made by the process of the invention have capacity factors as much as 30% higher than the present clay-bonded 4A molecular sieve articles. As will be apparent to those skilled in the adsorption art, an increase of such magnitude in the volumetric adsorption capacity for a solid adsorbent is a very worthwhile increase in the over-all capacity per unit packed volume of the adsorption system, or conversely, enables an appreciable reduction in equipment size from that normally required.

TABLE IV

*Preformed 4A Pellets[a] From Raw Kaolin–4A Mixtures*

| Wt.-Pct. 4A Powder in Mixture[d] | Digestion Time, Hr.[b] | Crystallization Time, Hr.[b] | Crystallization Temp., °C. | Product Purity, Pct.[c] | Capacity Factor |
|---|---|---|---|---|---|
| 40 | 16 | 8 | 100 | 93 | 0.76 |
| 40 | 16 | 8 | 75 | 84 | |
| 50 | 4 | 4 | 100 | 92 | 0.73 |
| 50 | 16 | 4 | 100 | 93 | 0.73 |
| 50 | 8 | 6 | 100 | 91 | 0.73 |
| 50 | 16 | 8 | 100 | 91 | 0.74 |
| 60 | 16 | 8 | 100 | 95 | |

[a] ⅛-in. diameter extrusions fired at 650° C. before digestion.
[b] Reactant mixture composition for digestion (at room temperature) and crystallization steps was:
$Na_2O/SiO_2=1.2$
$SiO_2/Al_2O_3=2.0$
$H_2O/Na_2O=40$ (based on reactive kaolin content).
[c] Based on adsorption of oxygen at −183° C. and 100 mm. Hg, and X-ray spectrometer analyses.
[d] Percentage based on weight of dry mixture.

Also, in accordance with the invention kaolin clay-bonded agglomerates of molecular sieve powder, wherein the agglomerate has been fired at a temperature above about 575° C., usually at around 650° C., such as the type now commercially available in the form of pellets of 4A Molecular Sieve zeolite from the Linde Company, a Division of Union Carbide Corporation, may be made a part of a suitable reactant mixture as previously described and treated therein to convert substantially all of the shaped body to crystalline zeolite.

Shaped zeolite A bodies obtained by the process of the invention after activation or dehydration usually adsorb at least about 19 wt.-percent oxygen measured at −183° C. and 100 mm. Hg pressure, and preferably at least about 21 wt.-percent oxygen, measured under the same conditions, to realize the highest volumetric adsorption capacities. By way of comparison, a typical value for the oxygen adsorption capacity of activated clay-bonded sodium zeolite A pellets is around 18.5 wt.-percent at −183° C. and 100 mm. Hg.

Representative of the practice of the present invention are the following examples:

EXAMPLE I

Eight and six-tenths grams of ¼-inch diameter kaolin-type clay pellets which had been fired for 3 hours at 700° C. were added to a screw-cap jar containing 2.1 grams of sodium aluminate (31.0 wt.-percent $Na_2O$, 45.1 wt.-percent $Al_2O_3$, 23.0 wt.-percent $H_2O$), 8.2 grams of sodium hydroxide and 78.8 grams of water to obtain a reactant mixture having the over-all composition:

$Na_2O/SiO_2=1.4$
$SiO_2/Al_2O_3=1.75$
$H_2O/Na_2O=40$

This mixture was allowed to digest quiescently at room temperature for 3 days before the crystallization step conducted for 24 hours at 100° C. The very hard pellets resulting from the reaction were washed and dried. By adsorption measurements, the activated product was found to contain 73% sodium zeolite A.

EXAMPLE II

One-sixteenth inch kaolin-type clay pellets formed by extrusion and containing about 7% lampblack grade carbon were fired for about 3 hours at 700° C. to give a porous reactive kaolin pellet. Ten grams of these pellets were placed in a screw-cap jar containing 9.0 grams of sodium hydroxide and 78.6 grams of water to obtain a reactant mixture having the over-all composition:

$Na_2O/SiO_2=1.2$
$SiO_2/Al_2O_3=2.2$
$H_2O/Na_2O=40$

This mixture was allowed to digest quiescently at room temperature for 3 days before the crystallization step conducted at 100° C. for 24 hours. The pellets were then washed and dried. X-ray analysis of the pellets indicated that they contained 87% Type 4A zeolite.

EXAMPLE III

Twenty-five grams of sodium zeolite A beads containing 20% kaolin binder which were fired at 600° C. for 15 hours, were placed in a screw-cap jar containing 51.1 grams water and 4.2 grams of sodium hydroxide. The resulting reactant mixture, having an over-all composition (on the basis of the chemical composition of the reactive kaolin content) in terms of oxide-mole ratios, of:

$Na_2O/SiO_2=1.4$
$SiO_2/Al_2O_3=1.9$
$H_2O/Na_2O=50$ was digested and crystallized for 24 hours at 100° C. X-ray spectrometer analyses showed that the washed and dried product had a purity of 96 wt.-percent Type 4A zeolite.

EXAMPLE IV

Ten grams of ¼-inch diameter pellets shaped from a raw kaolin-type clay were fired for 3 hours at 800° C. and were placed in a screw-cap jar containing 8.95 grams of sodium hydroxide and 78.6 grams of water to obtain a reactant mixture having the over-all molar composition:

$Na_2O/SiO_2=1.2$
$SiO_2/Al_2O_3=2.2$
$H_2O/Na_2O=40$

This mixture was allowed to digest quiescently at room temperature for 3 days before the crystallization step conducted for 24 hours at 100° C. The resulting hard pellets, after filtering and washing, and drying, contained 83% sodium zeolite A by X-ray analysis and 85% sodium zeolite A by adsorption measurements.

EXAMPLE V

Plaster molds of several shapes such as test tubes and crucibles were prepared. A "slip" composed of 40% reactive kaolin powder, 60% raw kaolin and water was prepared from 200 grams of reactive kaolin powder, 300 grams of raw kaolin, 500 grams of water and 2.5 grams of sodium carbonate, and after de-airing was pouring into the molds. These were allowed to stand until a shell of solid material 3–6 mm. thick had built up along the edges. Excess slip was then poured out. The kaolin-reactive kaolin bodies were removed from the molds and dried at room temperature. The forms were converted to reactive kaolin by a 16-hour firing period at 700° C. These bodies were digested quiescently at room temperature for 24 hours, and then recrystallized at 100° C. for 24 hours, employing an over-all reactant mixture composition of:

$Na_2O/SiO_2=1.4$
$SiO_2/Al_2O_3=2$
$H_2O/Na_2O=40$

X-ray spectrometer analysis of washed and dried samples of the products showed that the bodies were 90% sodium zeolite A.

EXAMPLE VI

A water slurry of 60% reactive kaolin and 40% raw Georgia kaolin was prepared. The slurry was filtered and the moist filter cakes were cut into disks 25 cm. in diameter and 2–7 cm. in thickness. After drying at room temperature these disks were fired at 700° C. for 16 hours to form reactive kaolin bodies. Digestion (quiescent) and crystallization were conducted, respectively, for 3 days at room temperature and for 22 hours at 100° C., using an over-all reactant mixture composition of:

$Na_2O/SiO_2=1.4$
$SiO_2/Al_2O_3=2$
$H_2O/Na_2O=40$

X-ray spectrometer analysis of samples of the washed and dried disks characterized them as 97% sodium zeolite A.

EXAMPLE VII

From a quantity of a Georgia kaolin made reactive by firing at 700° C. for 21 hours and a quantity of raw or unfired kaolin from the same source, a mixture of 40% reactive kaolin, 60% raw kaolin and sufficient water for extrusion was prepared. From this mix 3/16-inch diameter pellets were extruded. After drying in air, these pellets were fired at 700° C. for 15.2 hours. Digestion and crystallization were conducted, respectively, for 3 days at room temperature and for 24 hours at 100° C., using an over-all reactant mixture composition of:

$Na_2O/SiO_2 = 1.4$
$SiO_2/Al_2O_3 = 2$
$H_2O/Na_2O = 40$

After filtration, washing and drying, these pellets were found by X-ray spectrometer analysis to be 92% sodium zeolite A; adsorption analysis characterized the pellets as 100% sodium zeolite A.

EXAMPLE VIII

A mixture of 100 grams of reactive kaolin having a molar $SiO_2/Al_2O_3$ ratio of 2, and 212 grams of sodium silicate containing 25.2 wt.-percent $SiO_2$ were blended to form a thin slurry having a molar $SiO_2/Al_2O_3$ ratio of 4, to which 2 grams of a "Polyox" resin (Union Carbide Chemicals Company) were added. The resulting mixture, which had a dough-like consistency, was formed into pellets by hand-rolling and allowed to dry overnight at 100° C. in an air oven. These bodies were heated for 16 hours at 700° C. The pellets were grey-black in color and somewhat porous. Ten grams of these pellets, having the molar composition $0.466\ Na_2O:1.00\ Al_2O_3:4.0\ SiO_2$, were contacted with a liquor made up of 5.9 grams of NaOH and 58.8 grams of water. Thus, after mixing, the over-all reactant mixture had a molar composition, in terms of oxide, of:

$4\ Na_2O:Al_2O_3:4\ SiO_2:160\ H_2O$

This mixture was allowed to digest at room temperature for three days after which the crystallization steps was conducted on a steam bath for 24 hours. The resulting hard bodies were separated from the liquor by filtration and washing until the effluent wash water had a pH of about 10, and then dried. X-ray spectrometer analyses of two samples showed that the pellets were 73–74% zeolite X.

EXAMPLE IX

Ten grams of a finely divided carbon black were mixed with 90 grams of Georgia kaolin (molar $SiO_2/Al_2O_3 = 1.99$) and blended overnight on a roll mill. A portion of this mixture was mixed with enough water to form a smooth paste which was extruded into pellets through a die having 3/8 inch diameter openings. These pellets were dried at 100° C., and fired at 700° C. overnight. Ten grams of these reactive kaolin pellets were added to a liquor made from 9.84 grams of sodium hydroxide pellets dissolved in 86.25 grams of water to give an overall reactant composition, in terms of oxide-mole ratios, of:

$Na_2O/SiO_2 = 1.4$
$SiO_2/Al_2O_3 = 1.99$
$H_2O/Na_2O = 40$

The digestion and crystallization reactions were conducted in one step for 24 hours at 100° C. After filtering, washing, and drying, samples of the pellets were analyzed by the X-ray spectrometer method. A sodium zeolite A content of 83% was measured.

EXAMPLE X

Batches of extruded cylindrical pellets of 1/8-inch diameter were prepared from mixtures of Type 4A zeolite powder and each of two kaolin-type clays, one of which was a Georgia kaolinite and the other a North Carolina kaolin clay containing halloysite. The mixtures of zeolite and clay were 50 wt.-percent and 50 wt.-percent, respectively, based on bone-dry weight of zeolite and on moisture-free kaolin material, i.e., clay with no free water but still containing bound or combined water. The extruded pellets were oven-dried at 100° C. for about 16 hours and fired in an indirect gas-fired rotary kiln at 650° C. for 30 minutes. After cooling to room temperature, the pellets were placed in an alkaline liquor prepared from sodium hydroxide and water, the resulting over-all composition of the reactant mixture, in terms of oxide ratios, being as follows:

$Na_2O/SiO_2 = 1.2$
$SiO_2/Al_2O_3 = 2$
$H_2O/Na_2O = 40$ based on the reactive kaolin content of the pellet. The reactant mixtures were contained in sealed glass vessels. The room-temperature digestion periods were 16 and 72 hours, respectively, for the Georgia and North Carolina clay pellets, respectively. Crystallization of these two batches was conducted for 8 and 24 hours, respectively, in a circulating hot air oven maintained at 100° C. After the washing, drying and activation steps, X-ray spectrometer analysis and oxygen adsorption measurements at −183° C. and 700 mm. Hg showed that the polycrystalline pellets were 98 and 88 percent, respectively, Type 4A zeolite.

EXAMPLE XI

A mixture of 100 grams of powdered reactive kaolin, 527.6 grams of sodium silicate (containing 7.0 wt.-percent $Na_2O$, 25.2 wt.-percent $SiO_2$ and 67.3 wt.-percent $H_2O$) 82.8 grams of sodium hydroxide (77.5 wt.-percent $Na_2O$), 741 grams of water and 51.6 grams of sodium chloride was prepared and blended on a roll mill for 70 hours at room temperature. The over-all composition of the reactant mixture was, in terms of mole-oxide ratios:

$Na_2O/SiO_2 = 0.5$
$SiO_2/Al_2O_3 = 7$
$H_2O/Na_2O = 40$
$NaCl/Al_2O_3 = 2$

The solids were separated from the liquor by filtration, and the moist cake was extruded through a mill having a 3/16-inch die. The extrusions were dried at 110° C. for 1.5 hours and then returned to the mother liquor for digestion and crystallization. One batch of pellets which had been digested in a portion of this liquor for 24 hours at room temperature and then crystallized for 24 hours at 100° C. was found by X-ray analysis to be 92% zeolite Y with a $SiO_2/Al_2O_3$ ratio of 3.5; another batch of pellets, digested at room temperature for 48 hours and crystallized at 100° C. for 24 hours, analyzed 87% zeolite Y.

EXAMPLE XII

Fifty grams of 1/16-inch activated calcium A pellets (made from sodium zeolite powder which had been 68% calcium-exchanged) containing 20% reactive kaolin binder were placed in a screw-cap jar containing 61.7 grams of water and 7.0 grams of sodium hydroxide. The resulting reactant mixture, in addition to its calcium content, had an over-all composition (on the basis of the reactive kaolin content) in terms of oxide-mole ratios, of:

$Na_2O/SiO_2 = 1.4$
$SiO_2/Al_2O_3 = 2$
$H_2O/Na_2O = 40$

This mixture was digested at room temperature for 24 hours and crystallized at 100° C. for 24 hours. The pellets were separated from the mother liquor, washed and dried. X-ray analysis showed the zeolite A content of the pellets had increased to 89%. Measurements of nitrogen adsorption at −196° C. and 700 mm. Hg showed that the capacity had increased by about 10%, based on the original nitrogen capacity of the pellets, indicating that calcium exchange of the newly formed sodium zeolite A crystals had occurred.

In the process of this invention, the preformed body may undergo a thermal treatment at at least one of several temperature levels at a point in the process between the step of forming and the step of incorporating the body into the aqueous reactant mixture. Thus, the preform, if the kaolin content thereof is not already in a reactive condition, may be fired at a relatively high temperature as hereinabove described, or the preform containing reactive kaolin-type clay may, if desired, be heated to improve its physical properties, or as is usually the case, the preform is dried at room temperature or higher to provide a controlled moisture content before digestion.

The zeolite shapes made by the process of the invention may readily be ion-exchanged to replace all or part of the alkali metal cations in the crystalline body with cations of other species, such as calcium, and thus modify the selective adsorption properties of that body. Such cation exchange may be accomplished in one or more steps, using solutions containing cations of the desired species, by either batch or continuous ion-exchange methods.

Various changes or modifications may be made in the processes disclosed herein while securing to a greater or lesser extent some or all of the benefits of the invention, without departing from the spirit and scope thereof.

What is claimed is:

1. A method of producing crystalline metal aluminosilicate zeolite in preformed bodies, which method comprises forming reactive amorphous kaolin-type clay particles into dense, coherent, substantially uniformly shaped bodies; and reacting said bodies in an aqueous reactant mixture including alkali metal oxide until the bodies are converted to substantially pure crystalline zeolite, all of said alkali metal oxide needed for reaction with the clay being supplied by said aqueous reactant mixture.

2. A method of producing crystalline metal aluminosilicate zeolite in preformed bodies, which method comprises forming non-reactive crystalline kaolin-type clay particles into dense, coherent, substantially uniformly shaped bodies; thermally treating said bodies so as to convert the kaolin into the reactive amorphous state; and reacting said bodies in an aqueous reactant mixture including alkali metal oxide until the bodies are converted to substantially pure crystalline zeolite, all of said alkali metal oxide needed for reaction with the clay being supplied by said aqueous reactant mixture.

3. A method of producing crystalline zeolite A in preformed bodies, which method comprises forming a mixture containing essentially a reactive amorphous kaolin-type clay into dense, coherent, substantially uniformly shaped bodies; and reacting said bodies in an aqueous reactant mixture having in the aggregate, including said bodies, a composition expressed in terms of oxide mole ratios within the ranges of:

$Na_2O/SiO_2 = 0.5-1.5$
$SiO_2/Al_2O_3 = 1.6-2.4$
$H_2O/Na_2O = 10-100$ at a reaction temperature of at least about 20° C. until the bodies are converted to substantially pure crystalline zeolite A, all of the $Na_2O$ needed for reaction with the clay being supplied by said aqueous reactant mixture.

4. A method substantially as described in claim 3 wherein the aqueous reaction temperature is in the range from about 20° to 175° C.

5. A method substantially as described in claim 3 wherein the aqueous reaction temperature is in the range from about 20° to 100° C.

6. A method of producing crystalline sodium zeolite X in preformed bodies, which method comprises forming a mixture containing essentially a reactive amorphous kaolin-type clay and a source of silica into dense, coherent, substantially uniformly shaped bodies; and reacting said bodies in an aqueous reactant mixture having in the aggregate, including said bodies a composition expressed in terms of oxide mole ratios within the range of:

$Na_2O/SiO_2 = 1-1.5$
$SiO_2/Al_2O_3 = 2.5-5$
$H_2O/Na_2O = 30-60$ at a reaction temperature in the range from about 20° to 100° C., until the bodies are converted to substantially pure crystalline zeolite X, all of the $Na_2O$ needed for reaction with the clay being supplied by said aqueous reactant mixture.

7. A method of producing crystalline sodium zeolite Y in a preformed body, which method comprises forming a mixture containing essentially a kaolin-type clay which has been brought to a reactive amorphous condition, a source of silica and a water-soluble sodium salt into dense, coherent, substantially uniformly shaped bodies; drying said bodies, and digesting and crystallizing said bodies in an aqueous reactant mixture having in the aggregate, including said bodies, a composition expressed in terms of oxide mole ratios, of:

$Na_2O/SiO_2 = $ about 0.5
$SiO_2/Al_2O_3 = $ about 7
$H_2O/Na_2O = $ about 40 and 1 to 2 moles of said sodium salt per mole of $Al_2O_3$, at a reaction temperature in the range from about 20° to 100° C., until the bodies are converted to substantially pure crystalline zeolite Y, all of the $Na_2O$ needed for reaction with the clay being supplied by said aqueous reactant mixture.

8. A method for producing crystalline sodium zeolite A in preformed bodies which method comprises forming a mixture containing essentially a kaolin-type clay into dense, coherent, substantially uniformly shaped bodies; heating said bodies at a temperature between about 600° and 850° C. for at least about one hour so as to convert the kaolin into the reactive amorphous form and thereafter reacting said bodies in an aqueous reactant mixture having in the aggregate, including said bodies, a composition expressed in terms of oxide mole ratios within the ranges of:

$Na_2O/SiO_2 = 0.8-1.4$
$SiO_2/Al_2O_3 = 1.8-2.2$
$H_2O/Na_2O = 30-60$ at a reaction temperature in the range from about 20° C. to 100° C. until the bodies are converted to substantially pure zeolite A, all of the $Na_2O$ needed for reaction with the clay being supplied by said aqueous reactant mixture.

9. A method for producing crystalline sodium zeolite A in preformed bodies which method comprises forming a mixture containing essentially a kaolin-type clay into dense, coherent, substantially uniformly shaped bodies; heating said bodies at a temperature between about 600° and 850° C. for at least about one hour so as to convert the kaolin into the reactive amorphous form, and thereafter digesting and crystallizing said bodies in an aqueous reactant mixture having in the aggregate a composition, including said bodies, expressed in terms of oxide mole ratios of:

$Na_2O/SiO_2 = $ about 1.4
$SiO_2/Al_2O_3 = $ about 2
$H_2O/Na_2O = 40-50$ at a reaction temperature in the range from about 20° C. to 100° C. until the bodies are converted to substantially pure zeolite A, all of the $Na_2O$ needed for reaction with the clay being supplied by said aqueous reactant mixture.

10. A method of producing crystalline sodium zeolite X in preformed bodies, which method comprises forming a mixture containing essentialy a non-reactive crystalline kaolin-type clay and a source of silica into dense, coherent, substantially uniformly shaped bodies; thermally treating said bodies so as to convert the kaolin into the reactive amorphous form; and reacting said bodies in an aqueous reactant mixture having in the aggregate, including said bodies, a composition expressed in terms of oxide mole ratios within the range of:

$$Na_2O/SiO_2 = 1-1.5$$
$$SiO_2/Al_2O_3 = 2.5-5$$
$$H_2O/Na_2O = 30-60$$

at a reaction temperature in the range from about 20° to 100° C., until the bodies are converted to substantially pure crystalline zeolite X, all of the $Na_2O$ needed for reaction with the clay being supplied by said aqueous reactant mixture.

11. A method of producing crystalline zeolite A in preformed bodies, which method comprises forming a mixture containing 20–80 percent by weight of a reactive amorphous kaolin-type clay and the remainder a non-reactive crystalline kaolin-type clay into dense, coherent, substantially uniform shaped bodies; thermally treating said bodies so as to convert the crystalline kaolin into the reactive amorphous form; and reacting said bodies in an aqueous reactant mixture having in the aggregate, including said bodies, a composition expressed in terms of oxide mole ratios within the ranges of:

$$Na_2O/SiO_2 = 0.5-1.5$$
$$SiO_2/Al_2O_3 = 1.6-2.4$$
$$H_2O/Na_2O = 10-100$$

at a reaction temperature of at least about 20° C. until the bodies are converted to substantially pure crystalline zeolite A, all of the $Na_2O$ needed for reaction with the clay being supplied by said aqueous reactant mixture.

12. A method of producing a crystalline metal aluminosilicate zeolite in preformed bodies, which method comprises forming a mixture containing essentially a reactive amorphous kaolin-type clay and a crystalline zeolite into dense, coherent, substantially uniformly shaped bodies; and reacting said bodies with an aqueous reactant mixture containing in the aggregate essentially oxides of aluminum, silicon and an alkali metal in the proportions required to form the crystalline zeolite and at reaction temperature of at least about 20° C., until the bodies are converted to substantially pure crystalline zeolite, all of said alkali metal oxide needed for reaction with the clay being supplied by said aqueous reactant mixture.

13. A method of producing crystalline metal aluminosilicate zeolite in preformed bodies which method comprises forming a mixture containing non-reactive crystalline kaolin-type clay and a crystalline zeolite into dense, coherent, substantially uniformly shaped bodies; thermally treating said bodies so as to convert the kaolin into the reactive amorphous form; and reacting said bodies with an aqueous reactant mixture containing in the aggregate essentially oxides of aluminum, silicon and an alkali metal in the proportions required to form the crystalline zeolite, until the bodies are converted to substantially pure crystalline zeolite, all of said alkali metal oxide needed for reaction with the clay being supplied by said aqueous reactant mixture.

14. A method substantially as described in claim 12 wherein the amount of zeolite added is from 20 to 80 percent by weight of the dry mixture.

15. A method for producing crystalline zeolite A in preformed bodies which method comprises forming a mixture containing essentially a kaolin-type clay and from 20 to 80 percent by weight of the dry mixture of zeolite A into dense, coherent, substantially uniformly shaped bodies; heating said bodies at a temperature between about 600° and 700° C. so as to convert said clay into the reactive amorphous state; and reacting said bodies in an aqueous reactant mixture having in the aggregate a composition, including said clay but exclusive of said added zeolite A, expressed in terms of oxide mole ratios within the range of:

$$Na_2O/SiO_2 = 0.8-1.4$$
$$SiO_2/Al_2O_3 = about\ 2$$
$$H_2O/Na_2O = 30-60$$

at a reaction temperature in the range from about 20° to 100° C. until the bodies are converted to substantially pure crystalline zeolite A, all of the $Na_2O$ needed for reaction with the clay being supplied by said aqueous reactant mixture.

16. A method substantially as described in claim 15 wherein the amount of added zeolite A is between about 40 and 60 percent by weight of the dry mixture.

17. A method of producing crystalline sodium zeolite A in preformed bodies, which method comprises forming a mixture containing essentially a kaolin-type clay and up to 80 percent by weight of the dry mixture of sodium zeolite A into dense, coherent, substantially uniformly shaped bodies; heating said bodies at a temperature between about 600° and 700° C. for at least about 0.5 hour, reacting said bodies in an aqueous reactant mixture having in the aggregate a composition, including said clay but exclusive of said added sodium zeolite A, expressed in terms of oxide mole ratios within the range:

$$Na_2O/SiO_2 = about\ 1.4$$
$$SiO_2/Al_2O_3 = about\ 2$$
$$H_2O/Na_2O = 40-50$$

at a reaction temperature in the range from about 20° to 100° C. until the bodies are converted to substantially pure crystalline zeolite A, all of the $Na_2O$ needed for reaction with the clay being supplied by said aqueous reactant mixture.

18. A method of producing crystalline sodium zeolite A in preformed bodies, which method comprises forming a mixture containing essentially a kaolin-type clay and from about 40 to 60 percent, based on the weight of dry mixture, of sodium zeolite A into dense, coherent, substantially uniformly shaped bodies; heating said bodies at a temperature of about 650° C. for at least about 0.5 hour, reacting said bodies in an aqueous reactant mixture having in the aggregate a composition, including said clay but exclusive of said added sodium zeolite A, expressed in terms of oxide mole ratios, as follows:

$$Na_2O/SiO_2 = about\ 1.2$$
$$SiO_2/Al_2O_3 = about\ 2$$
$$H_2O/Na_2O = about\ 40$$

maintaining such reactant mixture at a digestion temperature of about 25° C. for a period of between about 4 and 16 hours, thereafter maintaining such mixture at a crystallization temperature in the range from about 75° to 100° C. for a period of between 4 and 16 hours to convert the bodies to substantially pure crystalline zeolite A, all of the $Na_2O$ needed for reaction with the clay being supplied by said aqueous reactant mixture, recovering said bodies, and at least partly dehydrating said bodies.

19. A method of producing crystalline zeolite A in preformed bodies which method comprises forming a mixture containing essentially a kaolin-type clay and a quantity of zeolite A powder which has been at least partly cation-exchanged, into dense, coherent, substantially uniformly shaped bodies; heating said bodies at a temperature between about 600° and 700° C., reacting said bodies in an aqueous reactant mixture having in the aggregate a composition, including said clay but exclusive of said added zeolite A, expressed in terms of oxide mole ratios within the range:

$$Na_2O/SiO_2 = 0.8-1.4$$
$$SiO_2/Al_2O_3 = about\ 2$$
$$H_2O/Na_2O = 30-60$$

at a reaction temperature in the range from about 20° C. to 100° C. until the bodies are converted to substantially pure mixed-cation zeolite A, all of the $Na_2O$ needed for reaction with the clay being supplied by said aqueous reactant mixture, recovering said bodies and at least partly dehydrating said bodies.

20. A method of producing a crystalline metal aluminosilicate zeolite in preformed bodies, which method comprises forming a mixture containing essentially a kaolin-type clay, and a void-forming diluent substance substantially combustible at about 600° C., and being selected from the group consisting of sawdust, powdered carbon, lampblack, powdered coke, methyl cellulose, ethyl cellulose, wood flour and starch into dense, coherent, substantially uniformly shaped bodies, heating said bodies at a temperature between about 600° and 850° C., and contacting said bodies with an aqueous reactant mixture containing in the aggregate, including said bodies, essentially oxides of aluminum, silicon and alkali metal in the proportions required to form the crystalline zeolite and at reaction temperatures of at least about 20° C., until the bodies are converted to substantially pure crystalline zeolite, all of said alkali metal oxide needed for reaction with the clay being supplied by said aqueous reactant mixture.

21. A method of producing crystalline sodium zeolite A in preformed bodies, which method comprises forming a mixture containing at least about 50 percent by weight of a kaolin-type clay and a void-forming diluent substance substantially combustible at about 600° C. and being selected from the group consisting of sawdust, powdered carbon, lampblack, powdered coke, methyl cellulose, ethyl cellulose, wood flour and starch, into dense, coherent, substantially uniformly shaped bodies, heating said bodies at a temperature between about 600° and 850° C., reacting said bodies in an aqueous reactant mixture having in the aggregate a composition including said bodies, expressed in terms of oxide mole ratios within the range:

$Na_2O/SiO_2 = 0.8–1.4$
$SiO_2/Al_2O_3 = $ about 2
$H_2O/Na_2O = 30–60$ at a reaction temperature in the range from about 20° to 100° C., until the bodies are converted to substantially pure sodium zeolite A, all of the $Na_2O$ needed for reaction with the clay being provided by said aqueous reactant mixture.

22. Preformed bodies of crystalline metal aluminosilicate zeolite prepared by the steps of forming reactive amorphous kaolin-type clay particles into dense, coherent, substantially uniformly shaped bodies; and reacting said bodies in an aqueous reactant mixture including alkali metal oxide until the bodies are converted to substantially pure crystalline zeolite, all of said alkali metal oxide needed for reaction with the clay being supplied by said aqueous reactant mixture.

23. Preformed bodies of crystalline metal aluminosilicate zeolite prepared by the steps of forming non-reactive crystalline kaolin-type clay particles into dense, coherent, substantially uniformly shaped bodies; thermally treating said bodies so as to convert the kaolin into the reactive amorphous state; and reacting the bodies in an aqueous reactant mixture including alkali metal oxide until the bodies are converted to substantially pure crystalline zeolite, all of said alkali metal oxide needed for reaction with the clay being supplied by said aqueous reactant mixture.

24. Preformed bodies of crystalline metal aluminosilicate zeolite prepared by the steps of forming a mixture containing essentially non-reactive crystalline kaolin-type clay and a crystalline zeolite into dense, coherent, substantially uniformly shaped bodies; thermally treating said bodies so as to convert the kaolin into the reactive amorphous state; and reacting said bodies in an aqueous reactant mixture including alkali metal oxide until the bodies are converted to substantially pure crystalline zeolite, all of said alkali metal oxide needed for reaction with the clay being supplied by said aqueous reactant mixture.

25. Preformed bodies of crystalline metal aluminosilicate zeolite prepared by the steps of forming a mixture containing essentially reactive amorphous kaolin-type clay and a crystalline zeolite into dense, coherent, substantially uniformly shaped bodies; and reacting said bodies in an aqueous reactant mixture including alkali metal oxide until the bodies are converted to substantially pure crystalline zeolite, all of said alkali metal oxide needed for reaction with the clay being supplied by said aqueous reactant mixture.

26. Preformed bodies of crystalline zeolite A prepared by the steps of forming a mixture containing essentially non-reactive kaolin-type clay and from about 40 to 60 percent, based on the weight of dry mixture, of sodium zeolite A, into dense, coherent, substantially uniformly shaped bodies; heating said bodies in an aqueous reactant mixture having in the aggregate a composition, including said clay but exclusive of said added zeolite A, expressed in terms of oxide mole ratios within the range of:

$Na_2O/SiO_2 = 0.8–1.4$
$SiO_2/Al_2O_3 = $ about 2
$H_2O/Na_2O = 30–60$ at a reaction temperature in the range from about 20° to 100° C. until the bodies are converted to substantially pure crystalline zeolite A, all of the $Na_2O$ needed for reaction with the clay being supplied by said aqueous reactant mixture.

References Cited in the file of this patent

UNITED STATES PATENTS

| | | |
|---|---|---|
| 1,477,757 | Hughes et al. | Dec. 18, 1923 |
| 2,143,670 | Young | Jan. 10, 1939 |
| 2,544,695 | Kumins | Mar. 13, 1951 |
| 2,882,243 | Milton | Apr. 14, 1959 |
| 2,904,607 | Mattox et al. | Sept. 15, 1959 |
| 2,992,068 | Haden et al. | July 11, 1961 |

FOREIGN PATENTS

| | | |
|---|---|---|
| 777,233 | Great Britain | June 19, 1957 |